L. JOHNSON AND H. BREARLEY.
APPARATUS FOR TESTING THE HARDNESS OF MATERIALS.
APPLICATION FILED SEPT. 27, 1919.
1,384,389.
Patented July 12, 1921.
2 SHEETS—SHEET 1.
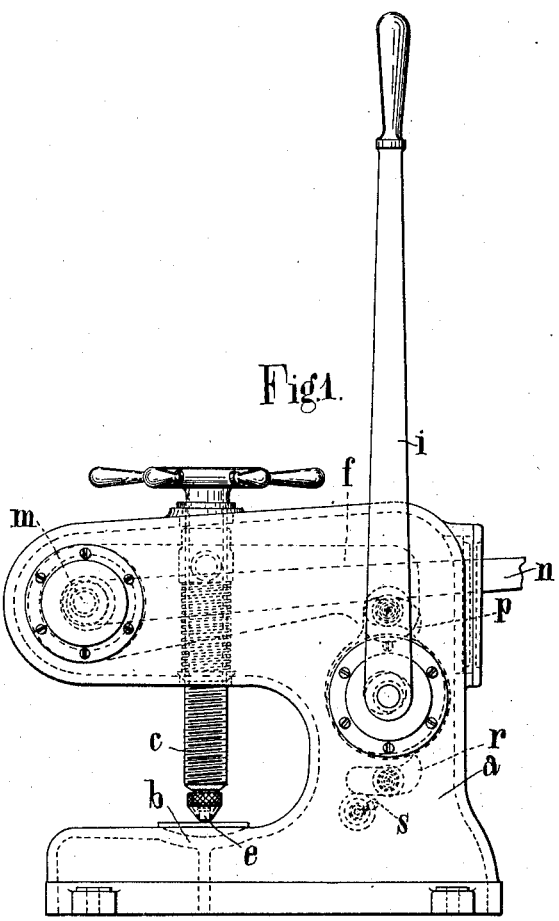
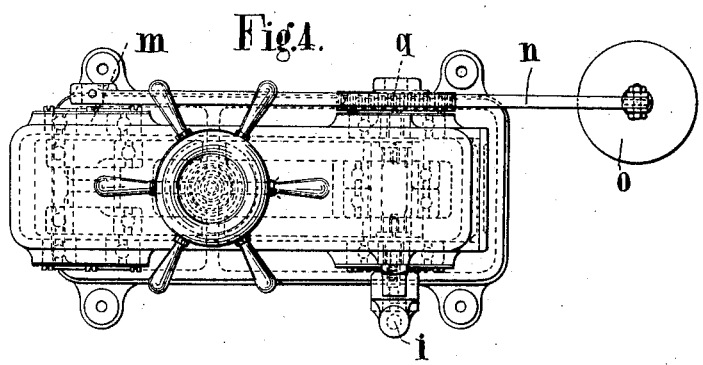
INVENTORS
L. Johnson & H. Brearley
BY H. R. Kerslake
ATTORNEY L. JOHNSON AND H. BREARLEY.
APPARATUS FOR TESTING THE HARDNESS OF MATERIALS.
APPLICATION FILED SEPT. 27, 1919.
1,384,389.  Patented July 12, 1921.
2 SHEETS—SHEET 2.
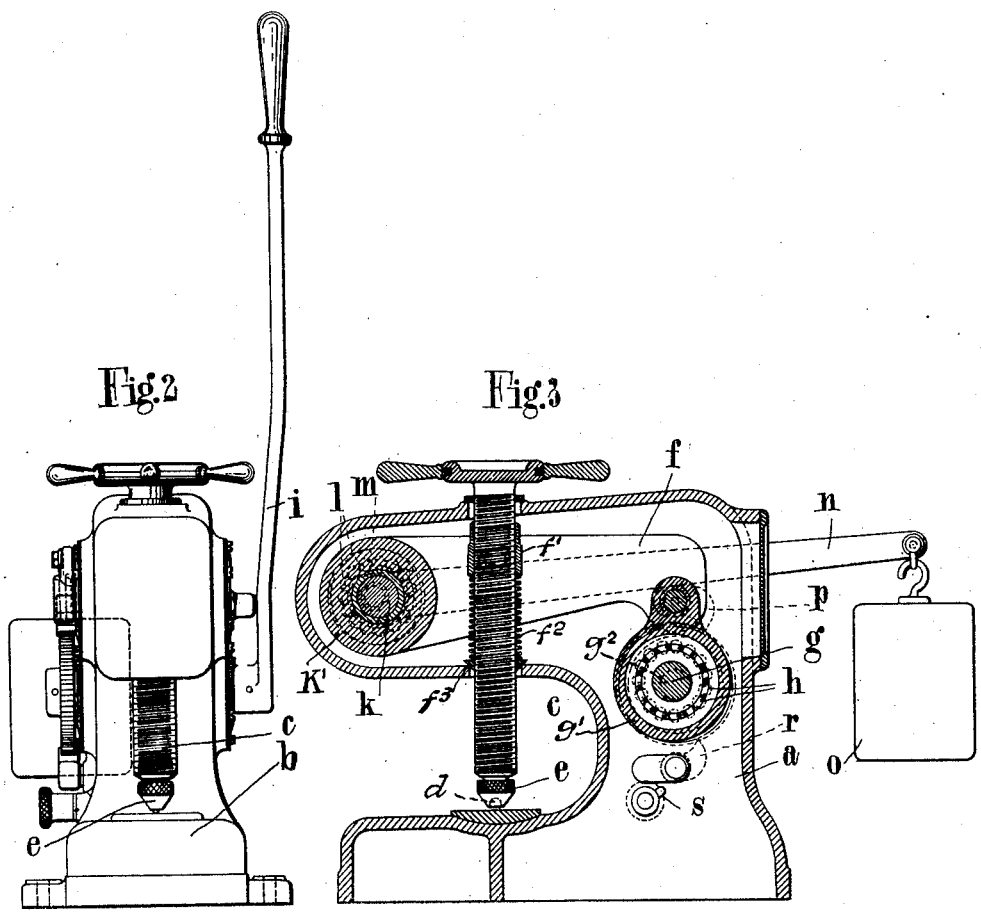
INVENTORS
L. Johnson & H. Brearley
BY H. R. Kerslake
ATTORNEY

UNITED STATES PATENT OFFICE.

LAWRENCE JOHNSON AND HARRY BREARLEY, OF SHEFFIELD, ENGLAND.

APPARATUS FOR TESTING THE HARDNESS OF MATERIALS.

1,384,389. Specification of Letters Patent. Patented July 12, 1921.

Application filed September 27, 1919. Serial No. 326,796.

*To all whom it may concern:*

Be it known that we, LAWRENCE JOHNSON and HARRY BREARLEY, both subjects of the King of Great Britain and Ireland, and both residing at Brown Bayley's Steel Works Limited, Sheffield, in the county of Yorkshire, England, have invented certain new and useful Improvements in Apparatus for Testing the Hardness of Materials, of which the following is a specification.

This invention relates to apparatus for testing the hardness of materials with particular reference to apparatus of the type comprising a hardened steel ball adapted to be forced into contact with the material under a predetermined pressure so that the depth or the diameter of the impression made in the material will be a measure of its hardness, the applied load being transmitted through a system of levers to a test weight or its equivalent so that the predetermined pressure may not be exceeded without an indication of such condition being given by movement of the weight.

The object of the present invention is to devise improved apparatus of the above character, whereby a constant predetermined pressure may be readily and with accuracy applied, and if necessary, maintained for any desired length of time.

The invention consists in apparatus of the type referred to, comprising in combination a member supporting a hardened steel ball, a lever carrying said member, an eccentric connected with said lever for applying the predetermined load, and a second eccentric connected with said lever and with a second lever or system of levers controlled by a weight or the like.

The invention also consists in the provision of means whereby the predetermined applied load may be maintained upon the hardened steel ball for any desired length of time.

The invention still further comprises the improved form of apparatus hereinafter described.

The accompanying drawings illustrate one convenient form of apparatus in accordance with the invention.

Figure 1 is a side elevation,
Fig. 2 is an end elevation,
Fig. 3 is a side sectional elevation, and
Fig. 4 is a plan.

In carrying our invention into effect in one convenient manner, we form our improved apparatus with a foundation framework or casing $a$ of any suitable character, upon a bed plate $b$ on which we support the material to be tested and above this bed plate is located a screw threaded spindle $c$ or other adjusting member carrying at its lower end a socket $e$ or fitting in which is mounted the hardened steel ball $d$. The member $c$ is carried by a lever $f$, as for example, by means of a nut $f'$ secured to said lever and is preferably cushioned by means of a spring $f^2$ arranged between the member $f'$ and a tapered washer $f^3$ engaging an aperture in the casing or framework $a$. One end of the lever $f$ is connected with an eccentric strap $g'$ coöperating with an eccentric $g$ mounted in ball or roller bearings $h$ and adapted to be rotated by a hand lever $i$ of suitable form, the lever $i$ and the eccentric both being carried upon the shaft $g^2$. The other end of the lever $f$ is connected with an eccentric strap $k'$ coöperating with the eccentric $k$ mounted in ball bearings $i$ and carried by a shaft $m$, it being understood that both the shafts $g^2$ and $m$ may also be mounted in ball bearings if desired.

Upon the shaft $m$ we mount a lever $n$, the free end of which carries a weight $o$, the amount of which is proportioned in relation to the leverage in a manner which is dependent upon the value of the predetermined maximum pressure which is to be applied by the hardened steel ball.

The arrangement is such that the necessary load is applied by rotating the hand lever $i$ and eccentric $g$ so that through the medium of the lever $f$ the hardened steel ball is forced under a predetermined pressure into contact with the material to be tested, the load being regulated and applied by means of the eccentric $k$ and the weight and lever connected therewith. Should the pressure tend to rise above the predetermined value, this would at once be indicated by upward movement of the lever $n$.

The amount of upward movement allowed to the lever may be limited by a suitable stop but in order to insure that the lever shall not reach the stop in operation and thus allow of the application of a pressure greater than the predetermined maximum we provide a pawl or detent $p$ mounted upon the casing $a$ and adapted to coöperate with a toothed sector $q$ or like member carried by the hand lever $i$, the arrangement being such that when the weight lever rises (on the predetermined pressure being reached) it allows the pawl to fall into engagement with the sector upon the hand lever and locks the same against movement in the direction for applying the load.

For the purpose of enabling the predetermined pressure to be maintained for any desired length of time, we provide a second pawl $r$ upon the framing of the machine operable by a pin or stop $s$ or other means so that when the predetermined pressure is reached the pawl may be made to engage the sector of the hand lever thus locking the same against rotation in the direction for releasing the load.

Claims:

1. Apparatus of the type referred to, comprising in combination a hardened steel ball, a member supporting said ball, a lever carrying said member, an eccentric connected with said lever for applying the predetermined load and a second eccentric connected with said lever and with a second lever or lever system controlled by a weight, substantially as described.

2. Apparatus of the type referred to comprising in combination a hardened steel ball, a member carrying same, a lever carrying said members, an eccentric connected with said lever, means connected to said lever adapted to impose a predetermined resistance to movement thereon in order to apply a predetermined load upon said hardened steel ball and means for maintaining the predetermined load for any desired length of time, substantially as described.

3. Apparatus of the type referred to, comprising in combination a hardened steel ball, a member supporting said ball, a lever carrying said member, an eccentric connected with said lever for applying the predetermined load, a second eccentric connected with said lever and with a second lever or lever system controlled by a weight, substantially as described.

4. Apparatus of the type referred to, comprising in combination a hardened steel ball, a member supporting said ball, a lever carrying said member, an eccentric connected with said lever for applying the predetermined load, a second eccentric connected with said lever and with a second lever or lever system controlled by a weight, and means for maintaining the predetermined load for any desired length of time, substantially as described.

5. Apparatus of the type referred to, comprising in combination a hardened steel ball, a member supporting said ball, a lever carrying said member, an eccentric connected with said lever for applying a predetermined load and means connected with said lever for preventing the load from rising above a predetermined limit, substantially as described.

6. Apparatus of the type referred to, comprising in combination a hardened steel ball, a member supporting said ball, a lever carrying said member, means for applying a load to said member, means for preventing said load from rising above a predetermined maximum, and means for maintaining said predetermined load for any desired length of time, substantially as described.

7. Apparatus of the type referred to, comprising a hardened steel ball, a member supporting said ball, a lever carrying said member, an eccentric at one end of said lever, a hand lever in connection with said eccentric, a second eccentric at the other end of said lever, a second lever connected with said last-mentioned eccentric, a weight controlling said lever, a toothed sector movable with said hand lever and a pawl for preventing, when necessary, movement of said sector in the direction for releasing the load, substantially as described.

8. Apparatus of the type referred to, comprising a hardened steel ball, a member supporting said ball, a lever carrying said member, an eccentric at one end of said lever, a hand lever in connection with said eccentric, a second eccentric at the other end of said lever, a second lever connected with said last-mentioned eccentric, a weight controlling said lever, a toothed sector movable with said hand lever and a pawl controlled by said weight-controlled lever so that said pawl will prevent movement of said toothed sector in the direction for applying the load when the weight controlled lever commences to rise, substantially as described.

In testimony whereof we have signed our names to this specification.

LAWRENCE JOHNSON.
HARRY BREARLEY.